June 17, 1958 — E. H. HARTMAN — 2,838,790
DEVICE FOR SHAPING PLASTIC MATERIALS
Filed June 20, 1955 — 3 Sheets-Sheet 1
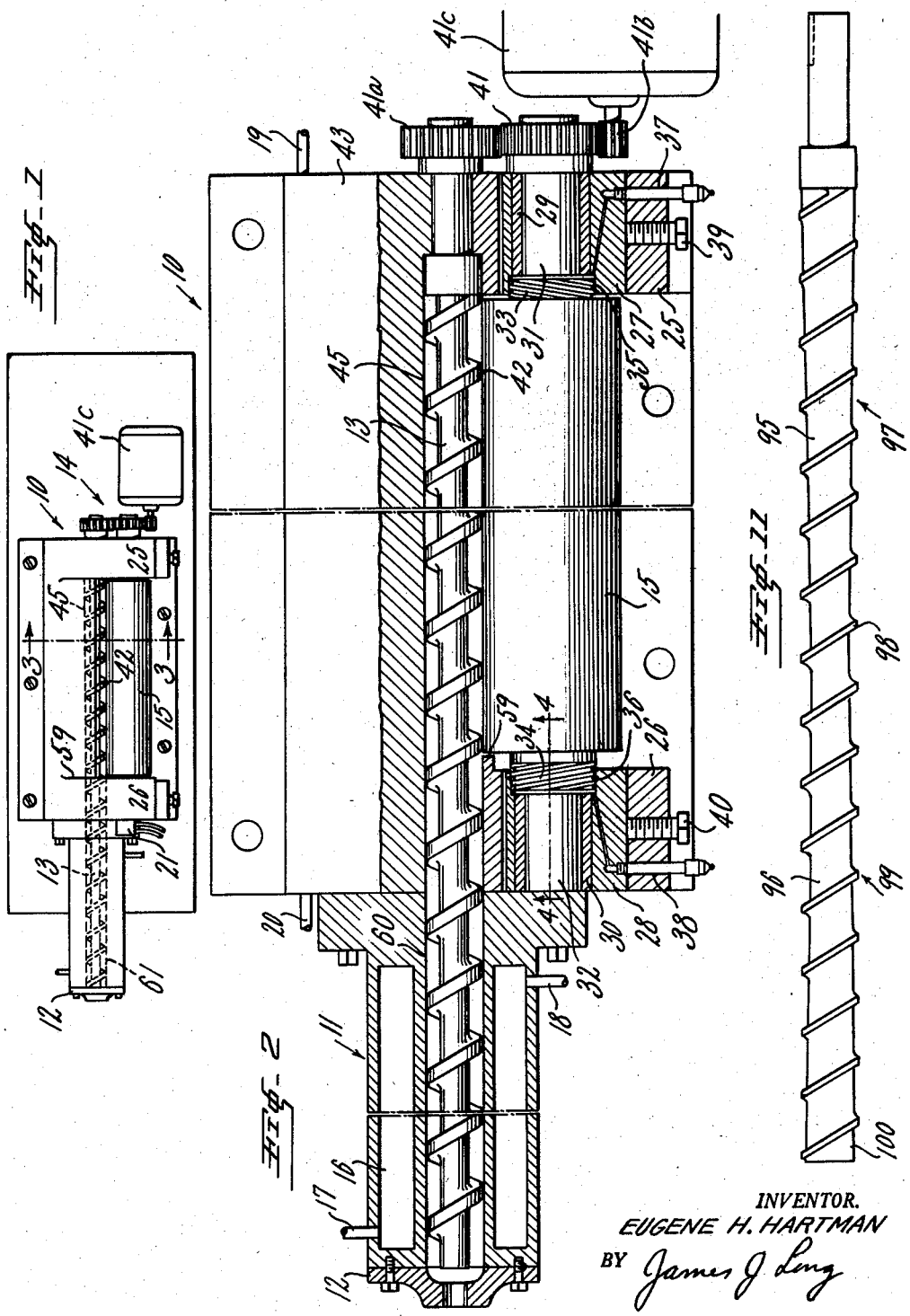
INVENTOR.
EUGENE H. HARTMAN
BY James J. Long
AGENT June 17, 1958     E. H. HARTMAN     2,838,790
DEVICE FOR SHAPING PLASTIC MATERIALS
Filed June 20, 1955     3 Sheets-Sheet 2
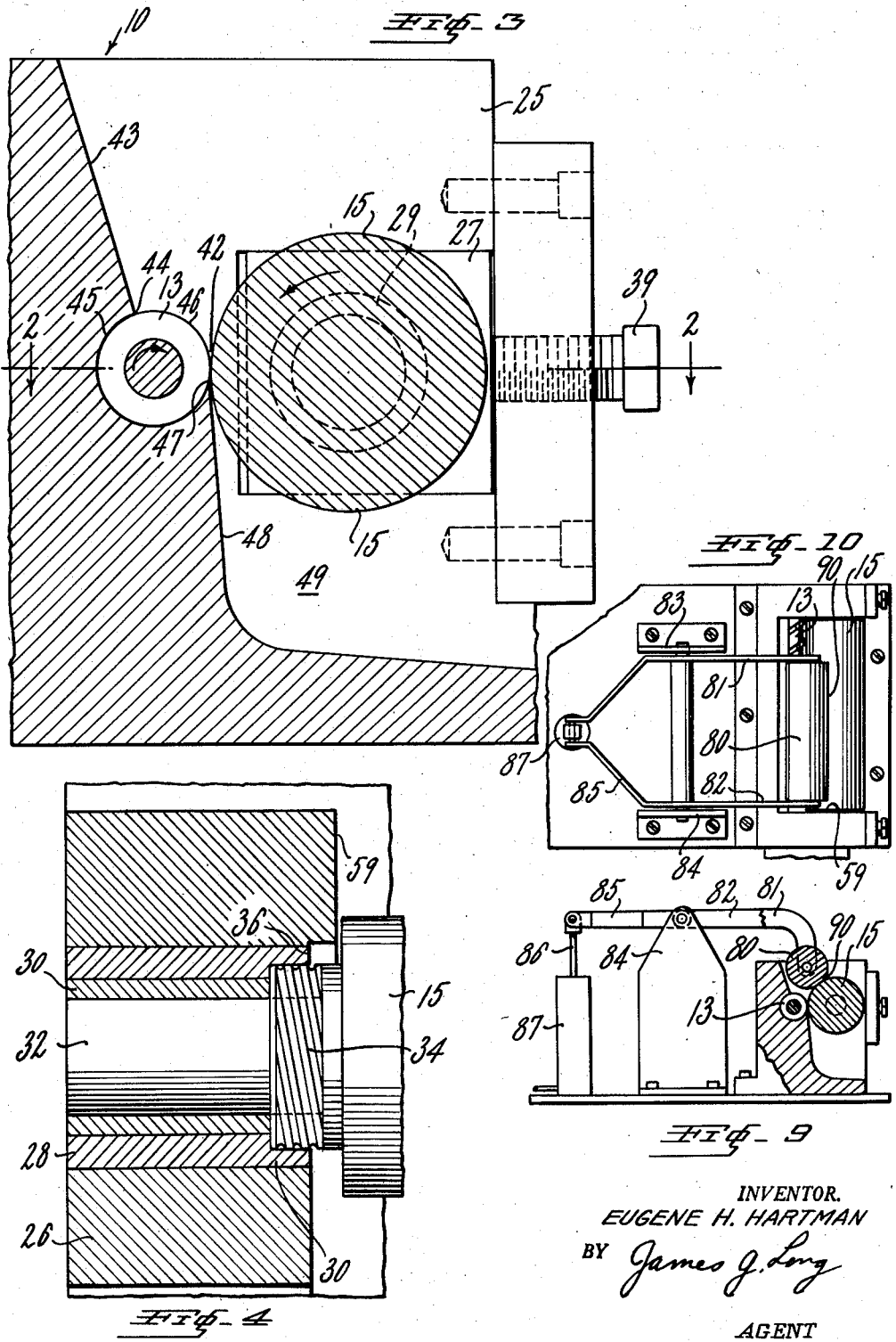
INVENTOR.
EUGENE H. HARTMAN
BY James G. Long
AGENT June 17, 1958 E. H. HARTMAN 2,838,790
DEVICE FOR SHAPING PLASTIC MATERIALS
Filed June 20, 1955 3 Sheets-Sheet 3
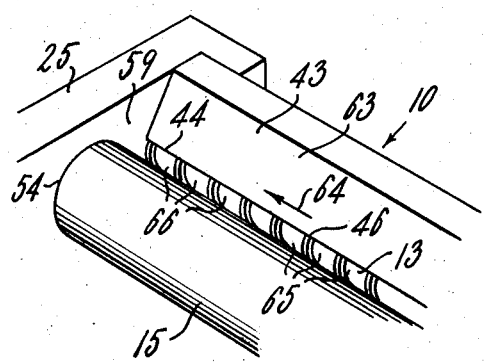
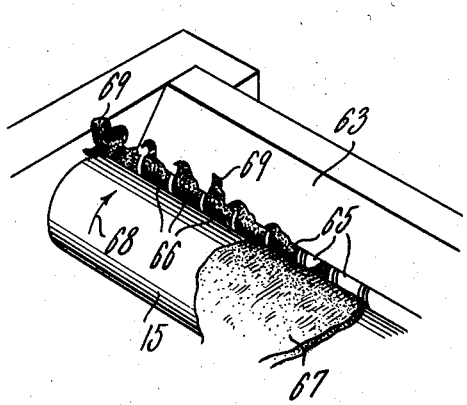
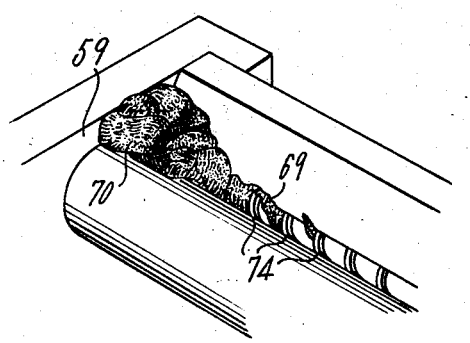
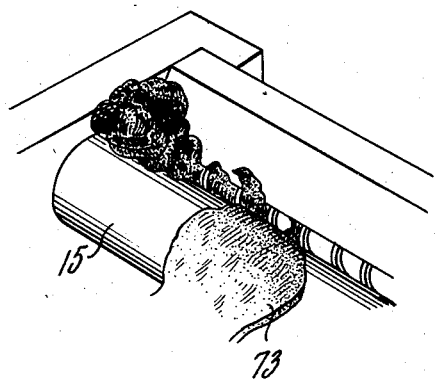
INVENTOR.
EUGENE H. HARTMAN
BY James J. Long
AGENT United States Patent Office 2,838,790
Patented June 17, 1958

2,838,790

DEVICE FOR SHAPING PLASTIC MATERIALS

Eugene H. Hartman, Boonton, N. J., assignor to United States Rubber Company, New York, N. Y., a corporation of New Jersey Application June 20, 1955, Serial No. 516,371

11 Claims. (Cl. 18—2)

This invention relates to an improved device for shaping plastic materials, and more particularly it relates to a novel device embodying characteristics of a roll mill and a screw extruder.

Conventional extruders for shaping raw rubber stocks and similar plastic materials employ an extrusion or feed screw rotating within a closely fitting enclosing barrel or cylinder in such a way as to advance the stock under pressure along the cylinder from an entrance opening or feed hopper, to which the stock is continually supplied, to an exit nozzle or die through which the stock is forced by the action of the screw, thereby imparting a desired cross-sectional shape to the stock. In order to form a uniformly shaped and homogeneous extrudate, the raw stock must be supplied to the ordinary extruder at a controlled uniform rate in order to maintain the pressure and quantity of stock at the die as continuously uniform as possible. Also, it is found necessary for proper operation in practice to pre-heat the usual rubber stocks to an elevated temperature to render the stock more plastic before it is fed into the extruder.

For the foregoing purposes, the manufacture of rubber goods by extrusion has heretofore required as a practical matter that the ordinary extruder be supplemented by a warm-up mill, on which the compounded rubber stock was worked and heated prior to being charged to the extruder. The usual practice was to mix the raw rubber with the desired compounding ingredients, and subject it to a desired degree of "break down," in internal mixers such as the Banbury mixer followed usually by additional mixing on roll mills, from which the stock was discharged in the form of more or less irregular slabs or sheets which were usually stacked on trucks where the stock cooled and was transported about the factory or stored until such time as it was ready to be placed on the warm-up mill preparatory to the actual extrusion.

The warm-up mill represents a considerable item of expense in connection with the manufacture of rubber goods by extrusion, not only because such mill is a heavy, expensive machine involving a considerable capital investment as well as expenses of maintenance and repair, but the warm-up mill also requires the services and attention of a skilled operator. There is also always the possibility that the warm-up milling will not be performed properly, with the result either that the stock is not sufficiently pre-heated, to the detriment of the extrusion operation, or with the result that the stock, which is vulcanizable and therefore heat-sensitive, will be heated too much and will thereby be "scorched" or pre-vulcanized, rendering it incapable of further satisfactory processing. Even when the stock is properly pre-heated, there is always a tendency for variable and uncontrollable amounts of heat to be lost between the warm-up mill and the extruder, thereby further adding to the difficulty of uniform operation. On the other hand, if excessive heat is imparted to the stock to compensate for time delays and loss of heat, one is again confronted with the danger of over-heating and consequent scorching.

For satisfactory rubber extrusion operations it is not only typically necessary that the stock be pre-heated on a warm-up mill as described, but it is also necessary to supply the thus-warmed stock to the entrance hopper of the extruder in the form of a strip of reasonably uniform cross-section, otherwise the extruder will not feed properly. For this reason, the warm-up mill is frequently equipped with a device for cutting the warm stock off of one of the mill rolls in the form of a strip, and in many installations provision is made for automatically transporting such strip continuously to the extruder hopper as the extrusion proceeds. However, even with such automatic devices it is found in practice that the extruder cannot be relied upon to take the feed strip continuously and uniformly. The inherent tendency of an extruder to feed irregularly is explained at some length in the commonly assigned copending application Serial No. 420,503 of Charles F. Varn, filed April 2, 1954 and now abandoned. As explained in that application, the tendency is for the plastic material to be drawn into the extruder at a greater rate than it is discharged, and when the barrel of the extruder and the troughs between the flights of the screw are stuffed with plastic, the material in the troughs at the receiving end of the screw is squeezed out into the entrance hopper. As illustrated in detail in the said application, such excess accumulated material tends to be shaped by the revolving action of the screw into the form of a somewhat mutilated conical roll or ball which is confined between the feed screw and the sides of the feed hopper, with the base of the cone disposed adjacent to the entrance to the extruder barrel. Such material rolls on the screw, but will not reenter the screw, and will prevent further proper entrance of the feed strip, unless forced to reenter by application of considerable pressure by an external agency. To this end, it has heretofore been necessary that an operator remain in attendance at the feed station of the extruder for the purpose of attempting to manually regulate the introduction of the feed strip to prevent the accumulation of excess material in the hopper if possible, and to force such excess back into the screw as best he can if it should develop. Not only does this arrangement represent undesirable consumption of man power, but is also far from satisfactory as far as consistency and quality of the results are concerned.

As far as the present inventor is advised, the foregoing unsatisfactory situation has represented the best previously known factory practice for many years, in spite of the fact that various proposals have been made prior to the present invention in an effort to improve the feeding of extruders. Thus, there is described in U. S. Patent 1,422,561 of Gomersall, issued on July 11, 1922, an extruder in which a small roll is incorporated in the feed hopper of an extruder for the purpose of aiding the feed. However, devices of that kind do not eliminate the warm-up mill or the strip feed, nor do they do away with necessity for having an operator in attendance at the feed station. The effect of devices of that kind on uniformity of feed has in the inventor's experience not been such as to lead to general adoption of that kind of machine.

Accordingly, a principal object of the present invention is to provide an extruder for plastic stock so constructed that it is unnecessary to employ a preliminary warm-up mill.

Another object is the provision of an extruder which automatically feeds continuously a proper, constant quantity of plastic stock.

Still another object is to provide an extruder capable of receiving rubber stock in bulk without necessity for strip feeding.

It is still a further object of the invention to provide an extruder which delivers a more uniform, homogeneous extrudate at a constant rate.

Yet another object of the invention is to provide an improved method of processing tough, difficultly extrudable raw rubber stocks in the cold in slab form, without necessity for warm-up milling or strip feeding.

Other objects of the invention are the provision of an extruder capable of extruding tough stocks, such as slab rag stock, which cannot be satisfactorily extruded on conventional extruders, and the provision of an extruding device which is also capable of masticating the stock.

The manner in which the invention accomplishes the foregoing and additional objects and advantages will be made manifest in the following detailed description, which is intended to be read with reference to the accompanying drawings, wherein:

Fig. 1 is a plan view of an extrusion device of the invention;

Fig. 2 is a similar fragmentary view on a larger scale with parts broken away and parts shown in section;

Fig. 3 is an enlarged sectional view taken along the line 3—3 of Fig. 1;

Fig. 4 is a fragmentary sectional view taken along the line 4—4 of Fig. 2;

Figs. 5, 6, 7 and 8 are perspective views of a portion of the device illustrating its action on a plastic stock;

Fig. 9 is an elevational view on a smaller scale of a modification of the invention with parts in section and parts broken away;

Fig. 10 is a plan view of the modification of Fig. 9; and,

Fig. 11 is a plan view of a modified form of extrusion screw adapted to be substituted in Fig. 2.

The extrusion device of the invention is characterized by the fact that in place of being provided with the usual small hopper for feeding a comparatively narrow strip of rubber stock to the screw, the screw housing toward the feed or entrance end of the screw is open for a considerable proportion of the length of the screw and over a relatively wide angle circumferentially of the screw, so that a large part of the screw is exposed lengthwise and circumferentially. A driven roll is mounted beside the exposed portion of the screw in such manner that the screw and roll together form an arrangement reminiscent of a two-roll mill, and capable of exerting a milling action on a bank of plastic stock contained above the nip in the spacing between the screw and the roll. In operation, the screw and the roll are rotated toward each other, and the plastic stock, which may be in the form of large or irregular chunks or slabs and which need not be pre-heated on a warming mill, may be thrown into the nip between the screw and roll without any particular regard for quantity, and will form a bank of stock from which the screw continuously automatically draws a proper amount of plastic stock and passes it through the enclosing portion of the extruder barrel to the extrusion die, without any tendency to underfeed or to include air bubbles.

Referring to the drawing, one embodiment of the invention shown therein includes an extruder body feed portion 10, to the delivery end of which is attached an extrusion cylinder 11 that in turn has an extrusion die member 12 fastened at its exit end or delivery end. An extrusion screw 13 extends lengthwise in the interior of the apparatus from a driving assembly 14 located toward the feed end of the extruder, into proximity with the die 12 on the delivery end. The feed portion 10 of the body is open at one longitudinal side (hereinafter frequently referred to as the front) and on top to accommodate a roll 15 that is rotatably mounted adjacent to the extrusion screw. A rather long portion of the screw corresponding to the length of the roll is exposed in the long hopper.

In general, for convenience of description, directions or parts toward the right-hand end of the apparatus as viewed in Figs. 1 and 2 will be referred to frequently as entrance or feed end directions or parts, since the plastic stock is introduced to the apparatus more or less toward such right-hand end, while directions or parts toward the left-hand end of the apparatus will be referred to frequently as delivery or exit end directions or parts, since the plastic stock is urged toward such left-hand end as it is processed, and it is finally delivered or discharged at the extreme left-hand end of the apparatus.

For the purpose of maintaining desired temperature conditions during operation of the device, the body of the extrusion cylinder 11 is provided with an internal chamber 16 which is in communication, by fluid inlet and outlet lines 17, 18 with a source of supply (not shown) of a fluid heat control medium. A fluid heat control medium may similarly be circulated through internal chambers (not shown) located in the walls of the extruder body feed portion 10 with the aid of lines 19, 20 leading to the chambers, and for the same purpose one end of the roll (which is internally cored) bears a rotary coupling 21 to which fluid temperature control medium supply lines are attached.

The feed portion of the extruder body 10 is defined between upright end pillars 25, 26 each of which contains a bearing block 27, 28 slidably mounted for adjusting movement toward and away from the screw, and containing suitable bearings 29, 30 through which reduced ends or shoulders 31, 32 of the roll 15 extend. To prevent a plastic stock which is being worked on the roll from entering into and clogging the bearings at each end of the roll, each such end portion of the roll, where it enters its respective bearing, is provided with a threaded bushing 33, 34 made of a suitable bearing material such as bronze. The threads on such bushing fit slidably within a smooth cylindrical recess 35, 36 of each of the end bearing blocks 27, 28. The threads are of such sense or direction that they tend to urge away from the respective adjacent bearings, and back toward the ends of the roll, any plastic stock that makes its way from the roll surface to the areas where the reduced ends enter the bearings. In this way such plastic material is continually urged away from the bearings, and the bearings remain clear and operative. Means are provided for lubricating the threads 33, 34 in the form of suitable lubricant channels 37, 38 extending through the respective end pillar and bearing block assemblies into proximity to the threads.

The bearing blocks 27, 28 and hence the roll 15, are adjustably positioned with respect to the extrusion screw 13 with the aid of adjusting screws 39, 40 extending from the assembly.

The end of the roll extending from the feed end of the extruder body into the driving assembly 14 carries a gear 41 which meshes with a similar gear 41a carried on the end of the extrusion screw 13. The roll gear 41 also meshes with a small gear 41b on the shaft of a driving motor 41c. The arrangement is such that the motor causes the roll to rotate toward a nip or bite 42 formed between the extrusion screw and the roll, that is, the roll rotates in a counter-clockwise direction as viewed in Fig. 3, while the screw rotates in an opposite direction toward the bite. In the arrangement shown the roll and the screw are driven at the same angular speed, but the peripheral speed of the roll is greater than the peripheral speed of the screw by reason of the greater diameter of the roll.

An upper longitudinal wall 43 (Fig. 3) of the open portion of the extruder body slants downwardly and inwardly toward the extrusion screw 13 and terminates at a point 44 adjacent to the upper surface of the screw, such point 44 being typically some 15° (as measured arcuately on the extrusion screw) removed in a counter-clockwise direction, as viewed in Fig. 3, from the vertical center line of the screw. A cylindrical recess 45, located at the lower termination of the upper wall 43, partially encloses and accommodates snugly the extrusion screw. The outer surface of the screw thread 46 makes sliding contact with the wall of such cylindrical chamber. A longitudinal edge 47 of the screw-accommodating recess 45 is located just below a point at which the screw and the roll come nearly into contact with each other, and such edge serves as a scraping means to direct plastic stock from the surface of the roll into the screw chamber. The arrangement is such that throughout the length of the relatively long hopper section the entire lower section of the screw is snugly enclosed and supported, starting at the scraping edge 47 and proceeding in a clockwise direction as viewed in Fig. 3 through an arc of some 255° extent to the point 44 representing an upper termination or edge of the recess for the screw. The entire lower arcuate portion of the screw thread is thus contacted and supported firmly in the hopper section. Below the scraping edge 47 the longitudinal wall 48 of the extruder body descends steeply, defining a relatively large open space 49 below the roll.

The center of the screw and the center of the roll are placed on essentially the same horizontal center line, and such arrangement results in exposure of approximately a 105° arc of the screw, starting at the nip or minimum spacing 42 between the roll and screw where the screw nearly contacts the roll, and proceeding in a counter-clockwise direction as viewed in Fig. 3 to the upper edge 44 of the screw-enclosing recess in the hopper body.

The delivery end pillar 26 has an inside surface 59 representing a forward wall of the open feed section of the extruder, and the delivery end of the portion of the roll 15 of large diameter is disposed in very close proximity to such end surface 59. A completely cylindrical passage 60 starts in the end wall 59 and continues through the extrusion barrel section 11 as far as the exit die 12. The enclosed cylindrical passage 60 forms an axial continuation of the partially cylindrical recess 45. The extrusion screw 13 thus extends the length of the partially enclosing recess 45 and continues on through the length of the completely enclosing cylinder 60 wherein the screw is surrounded and snugly enclosed, and wherein the plastic stock is finally prepared for entrance into the die, which has the usual shaping passage corresponding to the shape that it is desired to produce.

To understand best the unique mode of operation of the device, reference may be had to Figs. 5-8. In Fig. 5 it will be observed that the upper portion of the feed section of the machine presents a relatively large open area 63 that contrasts markedly with the usual deliberately and advisedly restricted small feed openings of the ordinary extrusion arrangement. At least about a 105° arc of the screw is preferably exposed to the open space. The roll and screw extend in near contact along the direction of extrusion (indicated by the arrow 64 in Fig. 5) to define in the lower portion of the open space a greatly elongated nip having a longitudinal extent equal to numerous turns or flights of the screw. Thus, toward the feed end of the screw there are a plurality of exposed troughs or spaces 65 defined between successive turns or flights of the screw thread in contact with the roll, and toward the delivery or exit end of the screw there are subsequent exposed spaces 66 where further turns of the screw thread are similarly in contact with the roll.

Assume that a large slab 67 (Fig. 6) of rubber stock is thrown into the open space 63 in the neighborhood of the first exposed screw troughs 65 and the roll is rotated in the direction of the arrow 68, while the screw is of course rotated in an opposite sense, so that both members rotate toward the nip or bite defined therebetween. The rotating action of the roll and screw draws the slab into the nip and a plurality of the first flights of the screw toward the feed end simultaneously take bites from the slab wherever the slab contacts the screw, and the thus bitten off portions are forced into the extrusion barrel until it is completely filled. Considerable back pressure is developed by reason of the resistance of the rubber to forward flow, particularly through the restricted exit die. The many portions of the slab chewed off by the screw in this way are more than sufficient to fill the troughs between the turns of the screw thread, and as soon as the extrusion barrel is filled the excess stock that is bitten off will be observed, as indicated in Fig. 6, to be regurgitated or forced out of the forward screw spaces 66 toward the delivery end in the form of elongated curling strips 69, the largest of which will appear toward the delivery end wall 59, where the screw enters the enclosed extrusion passage 60. These strips 69 are forced out of the forward turns of the screw toward the delivery end because of the pressure exerted by the stock in the rearward turns of the screw toward the feed end. The rubber slab 67 continues to be consumed in this manner at a rate substantially faster than the actual rate of extrusion, that is, the slab is bitten off at a rate greater than the rate at which the stock can emerge from the extruder die. The excess is continuously regurgitated and accumulates as a bank 70 (Fig. 7), comprising the expelled strips 69, which tends to jam against the delivery end wall 59 of the feed space. If this operation is allowed to continue the supply slab 67 is entirely consumed, as indicated at Fig. 7. The accumulated bank serves to keep the screw troughs replenished with stock, since there is a continual tendency for the screw flights to bite as much stock as possible off the accumulated bank itself. Therefore, the tendency is for the extrusion to continue at a uniform rate until the bank is essentially exhausted. If another slab 73 of rubber is deposited in the feed space, as indicated in Fig. 8, before the bank is consumed, the feeding and extrusion operation will proceed indefinitely in a self-regulating manner without interruption or surging or other undesirable variation. The stock will be continually bitten from the slab in amount greater than the screw can handle, the excess will be regurgitated, and the regurgitated portion will in turn continually be bitten off and expelled a second time or typically even a third or more times, depending on the exposed length of the screw and the amount of stock in the feed section.

Thus, there is a continual kind of circulating action in which the stock is taken into the screw, expelled into a bank, and taken into the screw again. There is thus exerted an unusual and highly beneficial working and mixing action which serves to make the stock more uniform, and to break down the stock by mechanical action, as well as to heat the stock by reason of the work thus done on the stock. In this aspect the device of the invention incorporates a combined milling action, that renders the usual separate preliminary warm-up mill unnecessary and makes it possible for the extruder to handle hard and tough kinds of stock that have heretofore been regarded as unextrudable for all practical purposes.

It will be understood that all the while the stock is being thus transferred from the supply bank to the screw and back again to the bank it is at the same time being urged in the direction of extrusion while it is in the screw that is, the stock bitten off at a point remote from the delivery end of the apparatus is expelled from the screw at a point nearer to the delivery end since the stock is positively advanced all the while it is in the screw trough. There is thus set up an efficient masticating and mixing or blending action that is enhanced by the tendency of the bank to squirm and shift position on the roll continually, thereby effecting an even more random interchange of stock.

In one aspect the combined action of the screw and roll on the rubber stock charged thereon may be regarded as a consequence of the scraping or wiping action of the screw on the bank carried on the surface of the roll. The screw contacts or nearly contacts the roll at numerous points 74 (Fig. 7), each such point representing one turn of the screw. These points move forwardly toward the delivery end as the screw rotates, thereby scraping the stock from the roll. At the same time the rotation of the roll is forcing the stock down into the path of the moving points of contact with the screw. Also, the scraping edge 47 (Fig. 3) of the screw housing below the nip tends to separate the stock from the roll and direct it into the screw troughs, with the result that at the nip the stock is inextricably caught and forced positively into the screw troughs, and there is no possibility of the bank of stock simply rolling above the nip without being bitten off to a substantial extent. This positive overfeeding action is responsible for the continuous entrance into the screw troughs of more stock than the extruder barrel can handle, with inevitable subsequent regurgitation as the delivery end is approached, as described.

The unusual nature of the invention in this respect will be appreciated when it is realized that it has heretofore been the practice to take great care not to have in the extruder feed hopper more stock than the screw can bite off and deliver, that is, great care was formerly taken to prevent overfeeding and consequent accumulation of stock in the hopper. The reason for this was, that with conventional feeding devices, any excess stock tended to accumulate in the form of a more or less conical roll or ball that simply rolled on top of the screw as the screw rotated. The screw would not bite stock off the thus-accumulated ball, and the ball would therefore block off the feed strip from the screw. The ball could be forced into the screw thread only with great difficulty by the operator who had to exert considerable downward force on the ball manually with a stick or other implement to consume the ball and permit the strip feed to be resumed. In view of this difficulty there was a tendency for the operators to underfeed the strip and take great care to prevent any accumulation in the hopper. Such underfeeding encouraged surging of the stock in the extruder as well as the inclusion of air in the stock.

The present arrangement is particularly beneficial from the standpoint of expelling all air or other gases from the stock. The tendency of the several turns of the screw toward the feed end of the hopper section to bite off and advance more stock than can be contained in the several flights of the screw toward the delivery end of the hopper section causes any gas included in the stock to be pressed positively out of the stock in the screw troughs. The rubber stock as conventionally prepared sometimes contains bubbles of air, or sometimes contains moisture or other volatile materials that tend to create voids within the stock, particularly when it is heated. The conventional feed screw arrangement also sometimes occasions air bubbles in the extrudate by reason of incomplete bites taken by the screw, that is, the screw trough does not always become completely filled with stock, either because of some deficiency in the biting action of the screw itself, or because of improper rate of feeding or improper size of the strip of stock introduced into the hopper. In the present arrangement, since there are many turns of the screw which bite forcibly at the bank of stock in cooperation with the roller, the screw inevitably becomes positively filled with firmly compacted stock that is free from all bubbles or voids. The recirculation of the stock from the screw to the bank as described also encourages the evaporation and expulsion of any volatile materials that might otherwise generate vapors within the extruder barrel. In this sense, the present apparatus provides for purging of gases and volatile matter from the stock in the large feed area.

In the modification of the invention shown in Figs. 9 and 10, the arrangement is the same as that previously described, but the apparatus is provided with an overhead roll 80 rotatably supported between the ends of arms 81, 82 of a fork that is pivotally supported on spaced upright members 83, 84 located on the side of the extruder away from the open feed area. An oppositely extending end 85 of the fork on the other side of the pivotal supports is pivotally secured to an upright piston rod 86 extending from a pneumatic cylinder 87. The arrangement is such that the forward end of the fork and the overhead roll assembly may be forced downwardly into the otherwise open feeding space of the hopper between the screw and the extruder roll. The downward force exerted on the overhead roll may be controlled by regulating the air pressure in the pneumatic cylinder.

With no plastic stock in the hopper, the overhead roll normally rides on the surface of the extruder roll, as illustrated in Fig. 9. As will be apparent, if there is no air pressure on the pneumatic cylinder, the overhead roll will simply bear against the extruder roll of its own weight, but as increasing air pressure is exerted in the lower part of the pneumatic cylinder the overhead roll will bear downwardly with correspondingly greater force.

The overhead roll 80 and the extruder roll 15 define between them a feed nip 90 into which slabs or other suitable portions of plastic stock are fed by hand. The positive action of the driven extruder roll 15 draws the stock between such roll and the overhead roll 80 into the principal extrusion feeding nip disposed below the overhead roll and defined between the extrusion roll and the extrusion screw 13, as previously described. The downward force exerted by the overhead roll serves to maintain the rubber in place in the feed area, and particularly prevents the increasing mass of regurgitated stock toward the delivery end wall 59 from rising up and spilling out of the feed area over the roll or over the delivery end pillar. The downward force exerted by the overhead roll in effect directs the expelled stock in such manner that it is distributed along the length of the feed area in the form of a more elongated bank than would otherwise be formed. The stock expelled or regurgitated toward the delivery end of the feed area tends to be returned, because of the confining action of the overhead roll, back toward the first part of the screw. Because the overhead roll is rotatably supported it does not interfere with rotation of the bank or with the circulating and milling action. The overhead roll is yieldingly urged in the downward direction by reason of the air pressure exerted in the lower portion of the pneumatic cylinder, and as large quantities of plastic stock are fed to the hopper the roll is urged upwardly by such stock. In this way, the hopper is enabled to accommodate a large bank of stock. This bank serves as a reserve supply of stock from which the extrusion screw continually draws material. Once such a reserve bank of stock is established, the extrusion device is rendered automatic and self-regulating for comparatively prolonged periods of time, and it is necessary for the operator to attend to the machine only occasionally for the purpose of making certain that there is an ample quantity of stock in the feed space.

In a particularly desirable modification of the invention the screw troughs or spaces between successive turns or flights of the screw thread are not of constant capacity or volume throughout the exposed length of the screw in the hopper section of the extruder. Instead, the troughs or spaces between successive turns of the screw thread have a relatively smaller volume toward the feed end of the screw and a relatively larger volume toward the delivery end of the hopper. Thus, the portion of the roll toward the feed end is in apposition to smaller screw spaces than the portion of the roll toward the delivery end. Such an arrangement has been found to provide markedly superior results, particularly in the case of excessively heavy stocks, because it avoids any undesirable tendency for the slabs of feed stock to be moved excessively rapidly toward the delivery end of the hopper. This prevents undesirable excessive accumulation of relatively cold or unworked stock at the entrance to the enclosed extrusion barrel.

It has been found particularly desirable to gradually increase the capacity of the screw troughs progressively from the neighborhood of the feed end of the hopper to the neighborhood of the delivery end of the hopper. Although the desired variation in screw capacity along the length of the screw may be accomplished in any suitable manner, a particularly advantageous way to accomplish this is to gradually decrease the root diameter of the screw from some point toward the feed end of the hopper to some point in the direction of the delivery end of the hopper.

Fig. 11 illustrates a particularly desirable form of extrusion screw adapted to be employed in the foregoing modification of the invention. In this modification the screw 95 has a variable root diameter 96. The rearward or feeding longitudinal section 97 of the screw, that is, the portion of the length of the screw that is contained in the open feed hopper, gradually decreases in root diameter in the direction of the extrusion, that is, the screw has a progressively smaller root diameter as it approaches the point 98 where it would enter the enclosed extrusion passage 60 if such screw were substituted for the unmodified screw 13 in Fig. 2.

Because the root diameter of the screw is greatest toward the feed end of the hopper, correspondingly smaller amounts of stock are bitten off at such end, and the rate of transfer of the feed toward the delivery end of the stock is correspondingly less. The stock is in general colder and stiffer toward such feed end of the hopper. On the other hand, toward the delivery end of the hopper where the stock is in general warmer and has had considerable working, the root diameter is smaller so that larger bites may be taken, thus making possible a desirably high rate of extrusion. This feature of the invention thus provides for taking variable quantities of stock into the screw at various points along the length of the hopper in such manner that a high rate of extrusion is maintained, but the transfer of cold stock from the far end to the delivery end of the hopper is slowed down. There is thus afforded more time for working and warming of the stock as it approaches the delivery end of the hopper.

Another particularly desirable modification of the invention contemplates an especially favorable variation in the capacity or volume of the screw troughs defined between successive flights or turns of the screw thread in the portion of the screw that is totally enclosed within the extrusion barrel. In accordance with such modification, the capacity or volume of the troughs located toward the delivery end of the extrusion barrel is made relatively smaller than the capacity toward the feed end of the enclosing extrusion barrel. This has been found to be highly advantageous from the standpoint of rendering the extrudate more homogeneous, since any unduly cold or hard portions of stock that might enter the extrusion barrel become more intensely worked and hence broken down and warmed as the discharge or delivery end of the screw is approached, due to the decreased available space within the screw. The extrusion operation is thus rendered more uniform. Preferably such change in capacity of the screw is progressive and gradual, extending over a major portion of the totally enclosed length of the screw, and although it may be accomplished in various ways, it is preferably provided for by gradually increasing the root diameter of the extrusion screw, from a point in proximity to the feed end of the enclosing extrusion cylinder, to a point in the neighborhood of the delivery end of the screw. Such a modification is incorporated in the modified form of extrusion screw shown in Fig. 11, wherein the forward length 99 of the screw, that is, the portion of the screw enclosed in the extrusion barrel 60 when the modified screw is substituted for the screw 13 of Fig. 2, has a gradually increasing root diameter toward the discharge end 100 of the screw.

Considering the device of the invention in general once more, it is desired to emphasize that the present extrusion machine combines in its feed or hopper section the characteristics of a roll mill. The structure as described provides for the formation of a bank of the feed stock which is worked and masticated repeatedly in the hopper and is thus warmed and broken down and rendered uniformly and highly plastic, as described. The great length of the screw exposed to the roll in the hopper, equal to 4 or preferably 6 or even more flights of the screw thread, makes the described milling action possible in a most advantageous manner. The great length of the roll and the correspondingly large size of the hopper make it possible to accommodate a large excess of the stocke being milled, and such excess serves as a source of supply for continuous, uniform extrusion.

The manner in which the stock is milled by the cooperating action of the long roll and long exposed length of the screw in the hopper of extensive length is believed to be particularly novel with respect to the slicing off and curling of the excess stock as illustrated particularly in Fig. 6. These sliced off curling strips of regurgitated material are formed as indicated previously when the excess stock in the screw flights is squeezed out, particularly at the lower edge 44 of the slanting longitudinal wall of the hopper. The bank of stock which is subjected to the milling action is formed of the accumulated expressed strips of stock.

In some cases, particularly in the case of the harder, not too tacky stocks, it is desirable to form a band of stock of appreciable thickness on the roll. For this purpose, the roll may be moved away from the screw slightly by suitable adjustment of the screws 39, 40 provided for this purpose. The lower scraping edge 47 of the screw recess serves to limit the thickness of the band formed on the roll. There is a continual interchange of stock from the band to the bank and vice versa as the milling and masticating operation proceeds.

In many cases it will be found advantageous to drive the screw and the roll independently to achieve a nicer control of the peripheral speed of both the screw and the roll. It is necessary that the surface speed of the roll be substantially greater than the peripheral speed of the screw.

It is desired to emphasize that the present extruder is highly advantageous from the standpoint of being able to receive and extrude properly even cold stocks that have not been pre-heated on a warming mill. It should also be noted that the extruder is adapted to receive the charged stock in the form of slabs or irregular chunks, rather than in the form of carefully prepared strips, as formerly needed. Thus, the pieces of stock charged to the present extruder are typically many times larger than one of the screw troughs, whereas in prior practice the strip feed had to be small enough to fit into a screw trough. Hard and tough stocks that are ordinarily considered unextrudable present absolutely no difficulty with the present machine. Thus, the type of stock known as rag stock, which contains fibrous material and which is used for forming insoles for footwear, can be extruded easily and uniformly with the present apparatus, whereas it was not possible to extrude this kind of stock with prior extruders. Reclaim stocks, and rubber stocks containing a considerable proportion of hard, resinous material, may be handled without difficulty. Highly accelerated stocks can be handled without danger of scorching because the continual circulation and advancement of the stock insures that no given increment of stock will be exposed to elevated temperature for unduly prolonged times. In general, a study of the heat history of a stock processed in the present machine shows that it is subjected to much less severe deteriorating heat treatment than that of a stock prepared on a warm-up mill prior to the extrusion.

Having thus described my invention, what I claim and desire to protect by Letters Patent is:

1. An extrusion apparatus comprising in combination an extruder feeding section, an extrusion barrel attached to the delivery end of said extruder feeding section, an extrusion die attached to the delivery end of said extrusion barrel, an elongated driven rotating extrusion screw extending through said feed section and said barrel into proximity to said die, the said feeding section being open for a considerable portion of the longitudinal extent of the screw to expose a plurality of turns of the screw over a substantial length and over a substantial peripheral arc of the screw, a driven rotating roll disposed longitudinally of and adjacent to the screw at said exposed portion of the screw, to provide a feeding nip in which plastic stock is forced into troughs between flights of the screw when the screw and roll are rotated toward each other, the said nip being sufficient in longitudinal extent to embrace a first plurality of turns of the screw remote from the delivery end of the extruder, wherein the screw troughs are first filled with plastic stock, and the said nip being further sufficient in longitudinal extent to embrace a second plurality of turns of the screw nearer the delivery end of the extruder than said remote turns, wherein overfed stock is expelled from the screw in the form of strips that are thus returned to a bank of stock formed in said nip.

2. An apparatus comprising in combination an extruder feeding section, an extrusion barrel attached to the delivery end of said extruder feeding section, an extrusion die attached to the delivery end of said extrusion barrel, an elongated driven rotating extrusion screw extending through said feed section and said barrel into proximity to said die, the said feeding section being open for a considerable proportion of the longitudinal extent of the screw to expose many turns of the screw over a substantial arc of the screw, a driven rotating roll disposed longitudinally of and adjacent to the screw at said exposed portion of the screw, to provide a feeding nip in which plastic stock is forced into troughs between flights of the screw when the screw and roll are rotated toward each other, an upper roll rotatably supported above said screw and first-mentioned roll, and means for yieldingly urging said upper roll downwardly on a bank of plastic stock contained on said screw and first-mentioned roll.

3. An apparatus for extrusion of plastic stock comprising an elongated extrusion screw having a thread extending from a feed end of the screw to a delivery end of the screw, a closely fitting enclosing cylinder surrounding the screw for a portion of its length at said delivery end, a hopper structure partially enclosing the screw for an extended portion of its length equal to many flights of the screw thread at its feed end, the periphery of the screw being exposed over a substantial arc of the screw in the said hopper structure, a roll disposed in the hopper structure alongside the exposed portion of the screw, and means for rotating the roll and screw toward each other whereby a charge of plastic stock placed on said roll and exposed portion of the screw is masticated therebetween and simultaneously charged at a continuously uniform rate through the said enclosing cylinder to the delivery end of the screw.

4. An apparatus for shaping hard, tough rubber stocks and the like which are ordinarily essentially unextrudable comprising in combination an elongated extruder feeding hopper into which relatively large and irregular slabs of the stock may be fed cold, an extrusion barrel attached to the delivery end of the hopper, an elongated driven rotating extrusion screw extending through the hopper and barrel into proximity to said die, the screw being disposed in a recess in a rear longitudinal wall of the hopper so as to be enclosed and supported over its entire lower portion and enclosed over a portion of its rear periphery, the arc of the screw thus enclosed amounting to about 255° while a remaining arc of the screw amounting to about 105° over the upper and forward periphery of the screw remains exposed and accessible, a driven rotating roll disposed longitudinally of and adjacent to the screw at said exposed portion of the screw, to provide a feeding nip in which the stock is masticated and forced into troughs of the screw when the screw and roll are rotated toward each other, whereby the stock is thus delivered in a uniformly plastic condition at a uniform rate through the said extrusion barrel to the said extrusion die.

5. An apparatus for processing cold slabs of raw rubber stock and shaping the same into a desired form comprising an elongated extrusion screw having a thread extending from a feed end of the screw to a delivery end of the screw, a closely fitting enclosing cylinder surrounding the screw for a portion of its length at said delivery end, a shaping die attached to the exit end of said cylinder, hopper structure secured to the feed end of said cylinder, said hopper structure only partially enclosing the screw for an extended portion of its length equal to many flights of the screw thread at the feed end of the screw, the periphery of the screw being exposed over an arc amounting to about 105° in the said hopper, a roll disposed in the hopper alongside the exposed portion of the screw, the longitudinal axes of the screw and roll being in substantially the same horizontal plane, and means for rotating the roll and screw toward each other whereby the said cold slabs of raw rubber stock charged to the hopper are masticated between the roll and screw and charged in a plastic state through the said cylinder to the said die.

6. An apparatus as in claim 5, in which the roll has a larger diameter than the screw, whereby when the roll and screw are driven at the same angular speed the surface speed of the roll exceeds the surface speed of the screw.

7. An apparatus as in claim 5, in which there is disposed above the screw and roll a means for exerting yielding downward force on a bank of stock contained on the screw and roll.

8. An apparatus for simultaneously milling and extruding a rubber stock comprising an extruder having a feed end and a delivery end, said extruder comprising an extruder feeding section, an extrusion barrel attached to the delivery end of said extruder feeding section, an extrusion die attached to the delivery end of said extrusion barrel, an elongated driven rotating extrusion screw extending through said feed section and said barrel into proximity to said die, the said feeding section being open for a considerable portion of the longitudinal extent of the screw to expose a plurality of turns of the screw over a substantial arc of the screw, a driven rotating roll disposed longitudinally of and adjacent to the screw at said exposed portion of the screw, to provide a feeding nip in which the stock is forced into troughs between flights of the screw when the screw and roll are rotated toward each other, the said nip being sufficient in longitudinal extent to embrace a first plurality of exposed turns of the screw at the feed end of the extruder, wherein the screw troughs are first filled with plastic stock, and the said nip being further sufficient in longitudinal extent to embrace a succeeding second plurality of exposed turns of the screw nearer the discharge end of the extruder, wherein overfed stock is expelled from the screw in the form of strips that are thus returned to a bank of stock formed in said nip, the exposed portion of the screw in the said feeding section having more space in said screw troughs toward the delivery end of such section than toward the feed end of such section.

9. An apparatus as in claim 8, in which the portion of the screw in said extrusion barrel has troughs of less capacity toward the delivery end of such portion than toward the feed end of such portion.

10. An apparatus as in claim 9, in which the root diameter of the screw gradually decreases from the feed end of said screw in the said exposed portion, and gradually increases toward the discharge end within the said barrel.

11. An apparatus for simultaneously milling and extruding a rubber stock comprising a hopper defined by two relatively widely spaced end walls and a longitudinal rear wall extending between said end walls, said rear wall having an upper downwardly and inwardly slanting portion, said slanting portion terminating at an edge defining the upper edge of a longitudinal recess in said rear wall, said recess having the cross-section of a partial circle, a longitudinal extrusion screw disposed snugly within said recess so as to completely enclosed and supported over the lower half of its periphery and partially enclosed over the rear upper portion of its periphery, the upper front portion of the screw being unenclosed by said recess and protruding therefrom to present an exposed arc of the screw, the lower and forward edge of the said recess forming a scraping edge at a line along the periphery of the screw in the horizontal central plane of the screw, a roll extending longitudinally between said end walls and disposed in close proximity to said scraping edge and the exposed portion of the screw, means for rotating the roll and screw toward each other whereby rubber stock charged to said hopper is masticated between the screw and roll, the said scraping edge serving to direct rubber stock into the troughs of the screw and to limit the thickness of a band of stock carried on the roll, the said screw extending out of a delivery end of the hopper, an extrusion barrel attached to such end of the hopper completely enclosing the extending portion of the screw, and a die attached to the delivery end of the barrel for shaping stock delivered thereto by the action of the screw.

References Cited in the file of this patent

UNITED STATES PATENTS

| | | |
|---|---|---|
| 2,264,237 | Brown | Nov. 25, 1941 |
| 2,441,222 | Fuller | May 11, 1948 |
| 2,615,199 | Fuller | Oct. 28, 1952 |
| 2,698,962 | Swallow | Jan. 11, 1955 |

FOREIGN PATENTS

| | | |
|---|---|---|
| 706,626 | France | Mar. 31, 1931 |